(12) United States Patent
Liu (10) Patent No.: US 11,522,288 B2
(45) Date of Patent: Dec. 6, 2022

(54) SIGNAL RECEIVING METHOD AND APPARATUS, AND COMPUTER-READABLE STORAGE MEDIUM AND ELECTRONIC DEVICE

(71) Applicant: BOE TECHNOLOGY GROUP CO., LTD., Beijing (CN)

(72) Inventor: Zongmin Liu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 489 days.

(21) Appl. No.: 16/606,957

(22) PCT Filed: Mar. 22, 2019

(86) PCT No.: PCT/CN2019/079186
§ 371 (c)(1),
(2) Date: Oct. 21, 2019

(87) PCT Pub. No.: WO2019/179511
PCT Pub. Date: Sep. 26, 2019

(65) Prior Publication Data
US 2020/0194888 A1    Jun. 18, 2020

(30) Foreign Application Priority Data
Mar. 22, 2018   (CN) .......................... 201810242145.0

(51) Int. Cl.
  *H01Q 3/38*    (2006.01)
  *H01Q 3/22*    (2006.01)
  *H01Q 3/44*    (2006.01)
  *H04B 1/18*    (2006.01)

(52) U.S. Cl.
  CPC ............... *H01Q 3/385* (2013.01); *H01Q 3/22* (2013.01); *H01Q 3/44* (2013.01); *H04B 1/18* (2013.01)

(58) Field of Classification Search
  None
  See application file for complete search history.

(56) References Cited

U.S. PATENT DOCUMENTS

2004/0203395 A1* 10/2004 Chizhik ................... H04B 7/01
                                                       455/63.1
2019/0131719 A1*  5/2019 Haziza ............... H01Q 21/0037

FOREIGN PATENT DOCUMENTS

| CN | 104253658 A | 12/2014 |
|----|-------------|---------|
| CN | 105591686 A | 5/2016  |
| CN | 105974389 A | 9/2016  |

(Continued)

OTHER PUBLICATIONS

CN105591686 translation (Year: 2016).*
International Search Report of PCT/CN2019/079186 in Chinese, dated May 31, 2019, with English translation.

*Primary Examiner* — Whitney Moore
(74) *Attorney, Agent, or Firm* — Collard & Roe, P.C.

(57) ABSTRACT

A signal receiving method and apparatus, a computer readable storage medium and an electronic device are disclosed. The signal receiving method includes: acquiring a maximum scanning angle range of a phased-array antenna; and reducing the maximum scanning angle range by a binary search method, based on power of signals received by the phased-array antenna, until a difference between a maximum and a minimum of a reduced scanning angle range is less than a set value; and using the reduced scanning angle range to receive a signal.

17 Claims, 4 Drawing Sheets

(56) References Cited

FOREIGN PATENT DOCUMENTS

CN 108449098 A 8/2018
WO 2017/197189 A1 11/2017

* cited by examiner

SIGNAL RECEIVING METHOD AND APPARATUS, AND COMPUTER-READABLE STORAGE MEDIUM AND ELECTRONIC DEVICE

CROSS REFERENCE TO RELATED APPLICATIONS

This application is the National Stage of PCT/CN2019/079186 filed on Mar. 22, 2019, which claims priority under 35 U.S.C. § 119 of Chinese Application No. 201810242145.0 filed on Mar. 22, 2018, the disclosure of which is incorporated by reference.

TECHNICAL FIELD

The present disclosure relates to the technical field of communication, and in particular to a signal receiving method and apparatus, a computer readable storage medium and an electronic device.

BACKGROUND

Phased-array antenna refers to a patterned antenna that changes the direction of the radiation pattern by controlling the feed phase of radiating elements in an array antenna. By controlling the phase, the orientation of the maximum of the radiation pattern of the antenna can be changed to achieve the purpose of receiving signals. Phased-array liquid crystal antenna is a phased-array antenna that realizes a phase control by utilization of liquid crystal deflection, and the phased-array liquid crystal antenna has received extensive attention in the field of display device.

SUMMARY

At least one embodiment of the present disclosure provides a signal receiving method, which includes:

acquiring a maximum scanning angle range of a phased-array antenna; and reducing the maximum scanning angle range by a binary search method, based on power of signals received by the phased-array antenna, until a difference between a maximum and a minimum of a reduced scanning angle range is less than a set value; and using the reduced scanning angle range to receive a signal.

Optionally, the reducing the maximum scanning angle range by the binary search method, based on the power of the signals received by the phased-array antenna, until the difference between the maximum and the minimum of the reduced scanning angle range is less than the set value, comprises:

determining an angle corresponding to the maximum scanning angle range as a to-be-processed angle; and executing an angle range reduction operation.

Optionally, the angle range reduction operation comprises: determining an angle range corresponding to the to-be-processed angle as the reduced scanning angle range, in response to an angle value of the to-be-processed angle being less than the set value;

dividing the to-be-processed angle into two symmetrical angles according to an angular bisector of the to-be-processed angle, in response to the angle value of the to-be-processed angle being not less than the set value;

controlling a direction of a main lobe of the phased-array antenna to respectively point to directions of angular bisectors of the two symmetrical angles;

acquiring the power of the signals received by the phased-array antenna in the directions of the angular bisectors of the two symmetrical angles respectively; and selecting, from the two symmetrical angles, a corresponding angle with larger power of the received signal as the to-be-processed angle and executing the angle range reduction operation again.

Optionally, the maximum scanning angle range is from −60° to +60°.

Optionally, the set value is 0.1°.

Optionally, the phased-array antenna is a phased-array liquid crystal antenna.

Optionally, the set value is a minimum angle scanning interval of the phased-array antenna.

Optionally, the above-mentioned method further includes: aligning a main lobe of the phased-array antenna to a direction of one of the maximum and the minimum of the reduced scanning angle range to receive the signal.

At least one embodiment of the present disclosure further provides a signal receiving apparatus, which includes:

an acquisition module, configured to acquire a maximum scanning angle range of a phased-array antenna; and a reduction module, configured to reduce the maximum scanning angle range by a binary search method, based on power of signals received by the phased-array antenna, until a difference between a maximum and a minimum of a reduced scanning angle range is less than a set value, wherein the reduced scanning angle range is used for receiving a signal.

Optionally, the reduction module is further configured to:
determine an angle corresponding to the maximum scanning angle range as a to-be-processed angle; and
execute an angle range reduction operation.

Optionally, the angle range reduction operation comprises: determining an angle range corresponding to the to-be-processed angle as the reduced scanning angle range, in response to an angle value of the to-be-processed angle being less than the set value;

dividing the to-be-processed angle into two symmetrical angles according to an angular bisector of the to-be-processed angle, in response to the angle value of the to-be-processed angle being not less than the set value;

controlling a direction of a main lobe of the phased-array antenna to respectively point to directions of angular bisectors of the two symmetrical angles;

acquiring the power of the signals received by the phased-array antenna in the directions of the angular bisectors of the two symmetrical angles respectively; and selecting, from the two symmetrical angles, a corresponding angle with larger power of the received signal as the to-be-processed angle and executing the angle range reduction operation again.

Optionally, the maximum scanning angle range is from −60° to +60°.

At least one embodiment of the present disclosure further provides a signal receiving apparatus, which includes:

a processing unit; and a memory, configured to store instructions that are capable of being executed by the processing unit, wherein in a case where the executable instruction are executed, the processing unit is configured to:

acquire a maximum scanning angle range of a phased-array antenna; and reduce the maximum scanning angle range by a binary search method, based on power of signals received by the phased-array antenna, until a difference between a maximum and a minimum of a reduced scanning angle range is less than the set value, and use the reduced scanning angle range to receive a signal.

Optionally, the processing unit is further configured to:

determine an angle corresponding to the maximum scanning angle range as a to-be-processed angle; and execute an angle range reduction operation.

Optionally, the angle range reduction operation comprises:

determining an angle range corresponding to the to-be-processed angle as the reduced scanning angle range, in response to an angle value of the to-be-processed angle being less than the set value;

dividing the to-be-processed angle into two symmetrical angles according to an angular bisector of the to-be-processed angle, in response to the angle value of the to-be-processed angle being not less than the set value;

controlling a direction of a main lobe of the phased-array antenna to respectively point to directions of angular bisectors of the two symmetrical angles;

acquiring the power of the signals received by the phased-array antenna in the directions of the angular bisectors of the two symmetrical angles; and selecting, from the two symmetrical angles, a corresponding angle with larger power of the received signal as the to-be-processed angle and executing the angle range reduction operation again.

Optionally, the maximum scanning angle range is from −60° to +60°.

Optionally, the set value is 0.10.

Optionally, the phased-array antenna is a phased-array liquid crystal antenna.

Optionally, the set value is a minimum angle scanning interval of the phased-array antenna.

Optionally, the processing unit is further configured to: align a main lobe of the phased-array antenna to a direction of one of the maximum and the minimum of the reduced scanning angle range to receive the signal.

At least one embodiment of the present disclosure further provides a computer readable storage medium, storing instructions, wherein in a case where the computer readable storage medium runs on a processing unit, the processing unit executes the signal receiving method as mentioned above.

At least one embodiment of the present disclosure further provides an electronic device, comprising the signal receiving apparatus as mentioned above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second." etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The embodiments of the present disclosure will be described in detail below with reference to the accompanying drawings. It should be noted that in the drawings, the same reference numerals are given to the components having substantially the same or similar structures and functions, and repeated description thereof will be omitted.

A signal receiving method is provided in the related art, in which the maximum scanning angle range of a phased-array antenna is acquired at first, and then the phased-array liquid crystal antenna is controlled each time according to the preset scanning angle to perform sequentially scanning within the maximum scanning angle range to receive signals.

The above signal receiving method adopts a sequential scanning manner, so the time taken to receive signals is long, and the efficiency of receiving signals is low.

Figure 1:
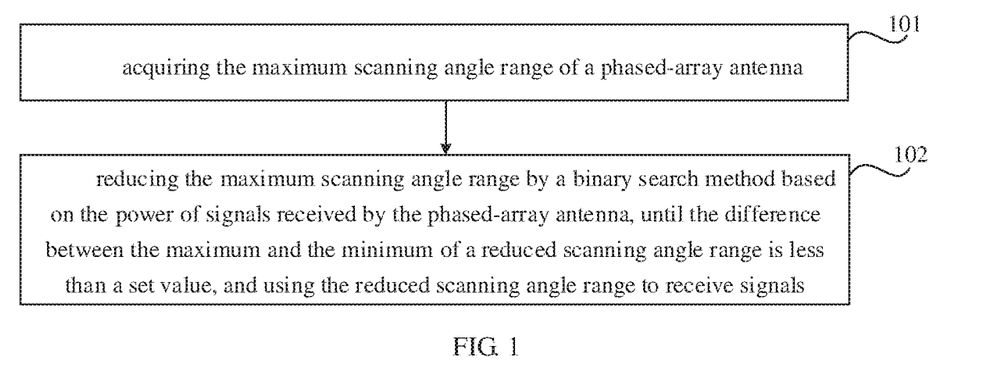
FIG. 1 is a flowchart of a signal receiving method provided by the embodiments of the present disclosure.

The embodiments of the present disclosure provide a signal receiving method, for instance, applied to a processing unit in an electronic device such as a display device. The processing unit may be a processor or a processing chip. The display device may be a smart mobile phone, a tablet PC, a smart TV, etc. As shown in FIG. 1, the method comprises:

S101: acquiring the maximum scanning angle range of a phased-array antenna.

S102: reducing the maximum scanning angle range by a binary search method based on the power of signals received by the phased-array antenna, until the difference between the maximum and the minimum of a reduced scanning angle range is less than a set value, and using the reduced scanning angle range to receive signals.

When the difference between the maximum and the minimum of the reduced scanning angle range is less than the set value, the display device can receive signals through the phased-array antenna based on the reduced scanning angle range.

In some embodiments, the above set value may be the minimum angle scanning interval of the phased-array antenna.

In some embodiments, the method further comprises: aligning the main lobe of the phased-array antenna to the direction of one of the maximum and the minimum of the reduced scanning angle range to receive the signal.

In summary, the signal receiving method provided by at least some embodiments of the present disclosure can acquire the maximum scanning angle range of the phased-array antenna, and reduce the maximum scanning angle range by the binary search method based on the power of the signal received by the phased-array antenna, until the difference between the maximum and the minimum of the reduced scanning angle range is less than the set value. As the maximum scanning angle range is reduced for multiple times by the binary search method, the time taken to receive the signal by the electronic device such as the display device is reduced, and the efficiency of receiving the signal is improved.

Figure 2:
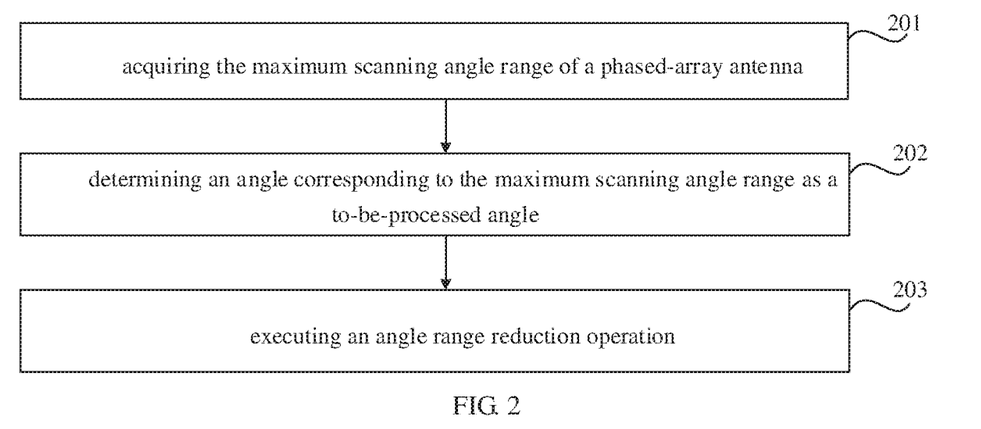
FIG. 2 is a flowchart of another signal receiving method provided by the embodiments of the present disclosure.

At least some embodiments of the present disclosure provide a signal receiving method, for instance, applied to a processing unit in a display device. As shown in FIG. 2, the method comprises the following steps S201 to S203:

S201: acquiring the maximum scanning angle range of a phased-array antenna.

Figure 3:
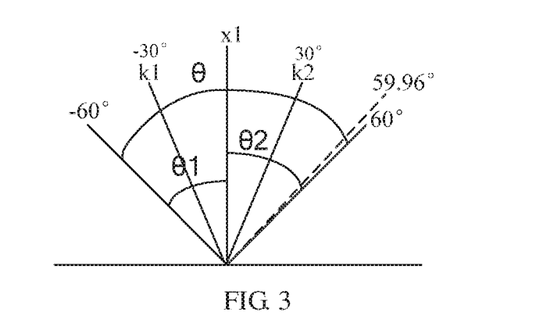
FIG. 3 is a schematic diagram of a signal receiving method provided by the embodiments of the present disclosure.

For example, the maximum scanning angle range of the phased-array antenna may be from −60° to +60°, as shown in FIG. 3. For instance, the maximum scanning angle range of the phased-array antenna may be prestored in a memory included in or relevant to the phased-array antenna, and then the maximum scanning angle range of the phased-array antenna can be acquired by reading the memory. Moreover, for instance, the maximum scanning angle range of the phased-array antenna may be preset and may also be determined according to the signal transmitted from the phased-array antenna when the processing unit and the phased-array antenna establish a connection, and the signal transmitted from the phased-array antenna may include information such as the type and the model of the phased-array antenna or directly includes the information of the maximum scanning angle range. However, it should be understood that no limitation will be given here in the embodiment of the present disclosure.

In the embodiments of the present disclosure, the phased-array antenna may be a phased-array liquid crystal antenna. The phased-array antenna may also be a phased-array antenna of a switching phase shifter based on micro-electromechanical system (MEMS), a phased-array antenna of a PIN diode switching phase shifter, a phased-array antenna of a complementary metal oxide semiconductor (CMOS) switching phase shifter, a phased-array antenna of a reflection phase shifter based on a variable capacitance diode, or a phased-array antenna of a loaded line phase shifter based on a magnetic conductivity adjustable medium such as a ferroelectric substance. The type of the phased-array antenna is not limited in the embodiments of the present disclosure.

S202: determining an angle corresponding to the maximum scanning angle range as a to-be-processed angle.

As shown in FIG. 3, in the step, an angle θ corresponding to the maximum scanning angle range may be determined as the to-be-processed angle.

S203: executing an angle range reduction operation.

Figure 4:
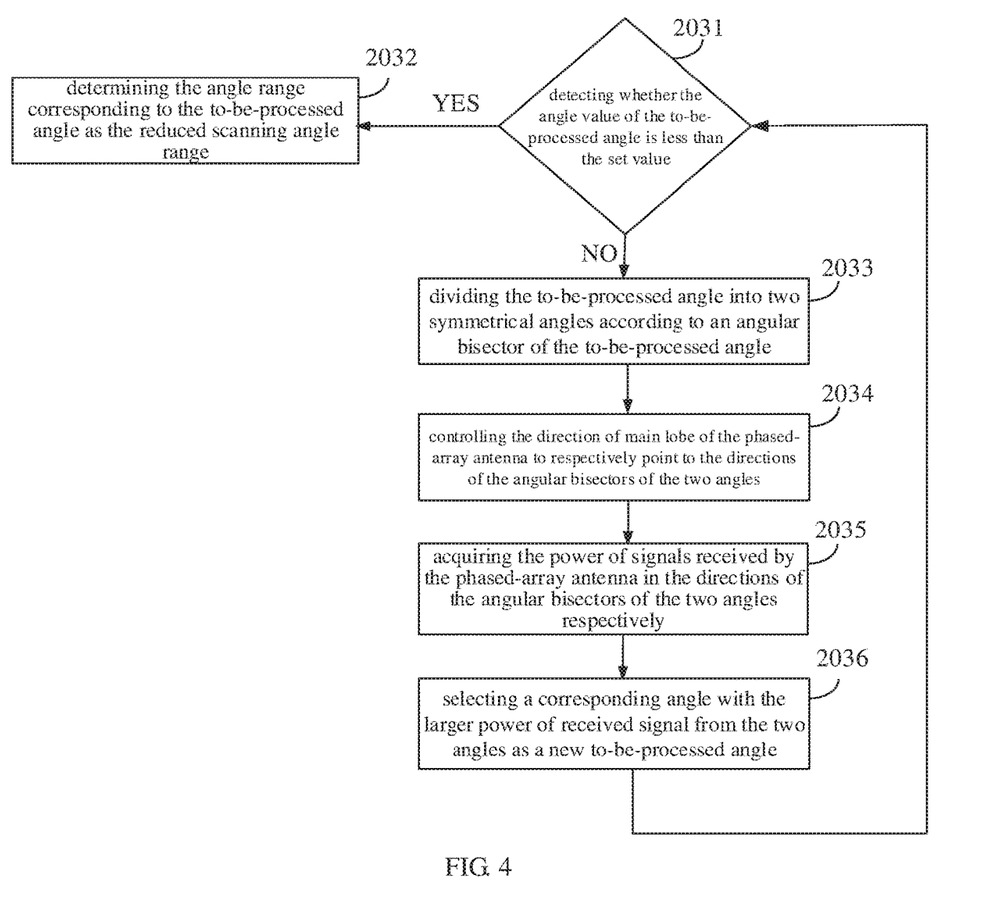
FIG. 4 is a flowchart illustrating the process of narrowing the angle range in the embodiments of the present disclosure.

As shown in FIG. 4, an example of the step S203 may include the following steps (sub-steps) S2031 to S2036:

S2031: detecting whether the angle value of the to-be-processed angle is less than the set value. When the angle value of the to-be-processed angle is less than the set value, the step S2032 is executed. When the angle value of the to-be-processed angle is not less than the set value, the step S2033 is executed.

For example, the set value may be 0.1°. As shown in FIG. 3, the angle of the to-be-processed angle θ is 120°. As 120°>0.1°, that is, the angle of the to-be-processed angle is not less than the set value, the step S2033 is executed.

S2032: determining the angle range corresponding to the to-be-processed angle as the reduced scanning angle range.

When the angle of the to-be-processed angle is less than the set value, the angle range corresponding to the to-be-processed angle is determined as the reduced scanning angle range. By now, the reduction operation of the maximum scanning angle range is ended. Subsequently, the display device may receive the signal through the phased-array antenna based on the determined reduced scanning angle range.

S2033: dividing the to-be-processed angle into two symmetrical angles according to an angular bisector of the to-be-processed angle. The step S2034 is executed.

In some embodiments of the present disclosure, supposing that the position of the signal to be received is disposed at the position of 59.96° in FIG. 3, as shown in FIG. 3, as the angle value of the to-be-processed angle θ is not less than the set value, the to-be-processed angle θ is divided into two symmetrical angles according to an angular bisector x1 of the to-be-processed angle θ. The two angles are respectively θ1 and θ2, in which the angle range corresponding to θ1 is (−60°, 0°), and the angle range corresponding to θ2 is (0°, 60°).

S2034: controlling the direction of main lobe of the phased-array antenna to respectively point to the directions of the angular bisectors of the two angles. The step S2035 is executed.

As shown in FIG. 3, in the step, the processing unit may control the direction of the main lobe of the phased-array antenna to respectively point to the directions of the angular bisectors of the two angles (namely θ1 and θ2); the direction of the angular bisector of θ1 is the direction indicated by k1 in FIG. 3 (namely the direction indicated by −30°); and the direction of the angular bisector of θ2 is the direction indicated by k2 in FIG. 3 (namely the direction indicated by 30°).

S2035: acquiring the power of signals received by the phased-array antenna in the directions of the angular bisectors of the two angles respectively. The step S2036 is executed.

As shown in FIG. 3, the processing unit acquires the power P1 of the signal received by the phased-array antenna in the direction k1 of the angular bisector of θ1, and the power P2 of the signal received by the phased-array antenna in the direction k2 of the angular bisector of θ2.

S2036: selecting a corresponding angle with the larger power of received signal from the two angles as a new to-be-processed angle, and executing the step S203 again.

As shown in FIG. 3, if the power P2 of the signal received by the phased-array antenna in the direction k2 is greater than the power P1 of the signal received by the phased-array antenna in the direction k1, the processing unit uses θ2 as the new to-be-processed angle.

Figure 5:
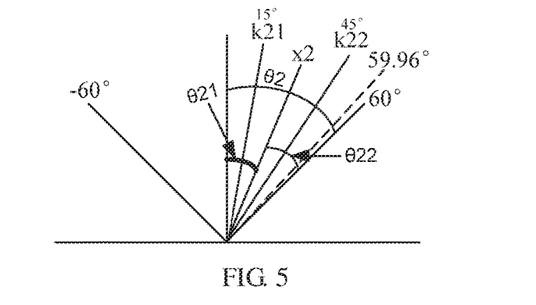
FIG. 5 is a schematic diagram of a signal receiving method provided by the embodiments of the present disclosure.

Subsequently, the step S203 is executed again. As shown in FIG. 5, the angle value of θ2 is 60°. As 60° is not less than 0.10, the processing unit divides θ2 into two symmetrical angles according to an angular bisector x2 of θ2. The two angles are respectively θ21 and θ22. The angle range corresponding to θ21 is (0°, 30°), and the angle range corresponding to θ22 is (30°, 60°). The processing unit controls the direction of the main lobe of the phased-array antenna to respectively point to the directions of the angular bisectors of the two angles (namely θ21 and θ22); the direction of the angular bisector of θ21 is the direction indicated by k21 in FIG. 5 (namely the direction indicated by 15°); and the direction of the angular bisector of θ22 is the direction indicated by k22 in FIG. 5 (namely the direction indicated by 45°). Subsequently, the processing unit acquires the power P21 of the signal received by the phased-array antenna in the direction k21 of the angular bisector of θ21, and the power P22 of the signal received by the phased-array antenna in the direction k22 of the angular bisector of θ22. If the power P22 of the signal received by the phased-array antenna in the direction k22 is greater than the power P21 of the signal received by the phased-array antenna in the direction k21, θ22 is taken as a new to-be-processed angle.

Figure 6:
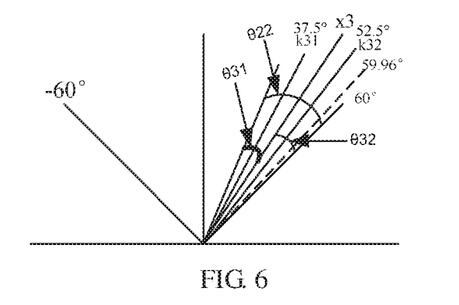
FIG. 6 is a schematic diagram of a signal receiving method provided by the embodiments of the present disclosure.

The step S203 is executed again. As shown in FIG. 6, the angle value of θ22 is 30°. As 30° is not less than 0.10, the processing unit divides θ22 into two symmetrical angles according to an angular bisector x3 of θ22. The two angles are respectively θ31 and θ32. The angle range corresponding to θ31 is (30°, 45°), and the angle range corresponding to θ32 is (45°, 60°). The processing unit controls the direction of the main lobe of the phased-array antenna to respectively point to the directions of the angular bisectors of the two angles (namely θ31 and θ32); the direction of the angular bisector of θ31 is the direction indicated by k31 in FIG. 6 (namely the direction indicated by 37.5°); and the direction of the angular bisector of θ32 is the direction indicated by k32 in FIG. 6 (namely the direction indicated by 52.5°). Subsequently, the processing unit acquires the power P31 of the signal received by the phased-array antenna in the direction k31 of the angular bisector of θ31, and the power P32 of the signal received by the phased-array antenna in the direction k32 of the angular bisector of θ32. If the power P32 of the signal received by the phased-array antenna in the direction k32 is greater than the power P31 of the signal received by the phased-array antenna in the direction k31, θ32 is taken as a new to-be-processed angle.

The step S203 is executed again. The angle of θ32 is 15°. As 15° is not less than 0.1°, the processing unit divides θ32 into two symmetrical angles according to an angular bisector x4 of θ32. The two angles are respectively θ41 and θ42. The angle range corresponding to θ41 is (45°, 52.5°), and the angle range corresponding to θ42 is (52.5°, 60°). The processing unit controls the direction of the main lobe of the phased-array antenna to respectively point to the directions of the angular bisectors of the two angels (namely θ41 and θ42). Subsequently, the processing unit acquires the power P41 of the signal received by the phased-array antenna in the direction k41 of the angular bisector of θ41 (namely the direction indicated by 48.75°), and the power P42 of the signal received by the phased-array antenna in the direction k42 of the angular bisector of θ42 (namely the direction indicated by 56.25°). If the power P42 of the signal received by the phased-array antenna in the direction k42 is greater than the power P41 of the signal received by the phased-array antenna in the direction k41, θ42 is taken as a new to-be-processed angle.

Analogically, in the process of executing the 11th angle range reduction operation, the angle of the new to-be-processed angle θ11 is 0.12°. As 0.12° is not less than 0.1°, the processing unit divides 11 into two symmetrical angles according to an angular bisector x11 of θ11. The two angles are respectively θ12 and θ13. The angle range corresponding to θ12 is (59.88°, 59.94°), and the angel range corresponding to θ13 is (59.94°, 60°). The processing unit controls the direction of the main lobe of the phased-array antenna to respectively point to the directions of the angular bisectors of the two angels (namely θ12 and θ13). Subsequently, the processing unit acquires the power P12 of the signal received by the phased-array antenna in the direction k12 of the angular bisector of θ12 (namely the direction indicated by 59.91°), and the power P13 of the signal received by the phased-array antenna in the direction k13 of the angular bisector of θ13 (namely the direction indicated by 59.97°). If the power P13 of the signal received by the phased-array antenna in the direction k13 is greater than the power P12 of the signal received by the phased-array antenna in the direction k12, θ13 is taken as a new to-be-processed angle.

The step S203 is executed again. The angle of θ13 is 0.06°. As 0.06° is less than 0.1°, the angle range (59.94°, 60°) corresponding to θ13 is determined as the reduced scanning angle range. By now, the reduction operation of the maximum scanning angle range is ended. Subsequently, the display device may receive the signal through the phased-array antenna based on the determined reduced scanning angle range.

As can be seen from above, by adoption of the signal receiving method provided by the embodiment of the present disclosure, when the position of the signal to be received is disposed at the position of 59.96° in FIG. 3, the processing unit may receive the signal after executing the angle range reduction operation for 11 times at most. Every time the angle range reduction operation is executed, the phased-array antenna executes the signal scanning operation twice, that is, the phased-array antenna executes the signal scanning operation for 22 times at most, so that the processing unit may obtain the power of the signals received in the directions of the angular bisectors of the two angles. The signal may only be received by performing scanning 1201 times by adoption of the sequential scanning method in the related art with the set value being 0.1°, so the time taken to receive the signal is long, and the efficiency of receiving the signal is low. Compared with the related art, the signal receiving method provided by the embodiment of the present disclosure reduces the time taken to receive the signal and improves the efficiency of receiving the signal by adoption of the binary search method to reduce the maximum scanning angle range.

In the embodiments of the present disclosure, supposing that the maximum scanning angle range of the phased-array antenna is −φ to +φ and the set value is 0, by adoption of the signal receiving method provided by the embodiments of the present disclosure, the position of the signal to be received is successively approximated by the binary search method, and the signal scanning operation is executed N1 times at most, where $$N1 \le 2 \times \log_2 \frac{2 \times \varphi}{\beta}.$$

By adoption of the sequential scanning mode in the related art, the signal scanning operation must be executed N2 times in total, where $$N2 = \frac{2 \times \varphi}{\beta} + 1.$$

As can be seen from above, N1<<N2, it can be seen that the signal receiving method provided by the embodiments of the present disclosure greatly reduces the time taken to receive the signal and improves the efficiency of receiving the signal.

It should be noted that the signal receiving method provided by the present disclosure not only can be used for one-dimensional signal scanning but also can be used for multi-dimensional signal scanning.

It should be noted that the sequence of the steps of the signal receiving method provided by the embodiment of the present disclosure can be appropriately adjusted, and the steps can also be correspondingly increased or decreased according to the actual situation. Any method that can be easily thought of by those skilled in the art within the technical scope disclosed by the present disclosure shall fall within the scope of protection of the present disclosure, so no further description will be given here.

In summary, the signal receiving method provided by the embodiments of the present disclosure can acquire the maximum scanning angle range of the phased-array antenna, and reduce the maximum scanning angle range by the binary search method based on the power of the signals received by the phased-array antenna, until the difference between the maximum and the minimum of the reduced scanning angle range is less than the set value. As the maximum scanning angle range is reduced multiple times by the binary search method, the time taken to receive the signal of the display device is shortened, and the efficiency of receiving the signal is improved.

Figure 7:
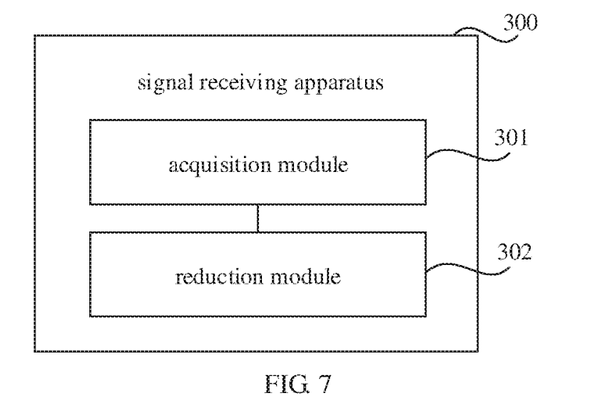
FIG. 7 is a block diagram of a signal receiving apparatus provided by the embodiments of the present disclosure.

At least some embodiments of the present disclosure provide a signal receiving apparatus 300. As shown in FIG. 7, the apparatus comprises: an acquisition module 301 and a reduction module 302.

The acquisition module 301 is configured to acquire the maximum scanning angle range of a phased-array antenna.

The reduction module 302 is configured to reduce the maximum scanning angle range by the binary search method based on the power of signals received by the phased-array antenna, until the difference between the maximum and the minimum of the reduced scanning angle range is less than the set value, and the reduced scanning angel range is used for receiving the signal.

In some embodiments, the acquisition module 301 and the reduction module 302 can be implemented by hardware, software, firmware or any combination thereof. If implemented by software, these functions may be implemented as one or more instructions or codes that are stored in a computer readable medium or transmitted via the computer readable medium. The computer readable medium includes computer a readable storage medium. The computer readable storage medium can be any available storage medium that can be accessed by a computer. By way of example and not limitation, such computer readable media may include RAMs, ROMs, EEPROMs, CD-ROMs, other optical disk memories, magnetic disk memories, other magnetic storage devices, or any other media that can be used to carry or store desirable program codes in the structural form of instruction or data and can be accessed by a computer. In addition, the propagated signal is not included in the scope of the computer readable storage medium. The computer readable medium further includes a communication medium which includes any medium that facilitates the transfer of a computer program from one place to another. The connection, for instance, may be a communication medium. For instance, if the software uses a coaxial cable, an optical cable, a twisted-pair cable, a digital subscriber line (DSL), or wireless technology such as infrared beams, radio and microwaves to transmit from a web site, a server or other remote sources, the coaxial cable, the optical cable, the twisted-pair cable, the DSL, or the wireless technology such as infrared beams, radio and microwaves are included in the definition of the communication medium. The combination(s) of the above shall also fall within the scope of the computer readable medium. Alternatively or optionally, the function described here may be at least partially executed by one or more hardware logic modules. For instance, the illustrative types of applicable hardware logic modules include field programmable gate array (FPGA), application specific integrated circuit (ASIC), application specific standard product (ASSP), system on chip (SOC), complex programmable logic device (CPLD), etc.

In summary, at least some embodiments of the present disclosure provide a signal receiving apparatus. The apparatus may acquire the maximum scanning angle range of the phased-array antenna, and reduce the maximum scanning angle range by the binary search method based on the power of the signals received by the phased-array antenna, until the difference between the maximum and the minimum of the reduced scanning angle range is less than the set value. As the maximum scanning angle range is reduced multiple times by the binary search method, the time taken to receive the signal of the display device is shortened, and the efficiency of receiving the signal is improved.

Optionally, the reduction module 302 is configured to: determine an angle corresponding to the maximum scanning angle range as a to-be-processed angle; and execute the angle range reduction operation.

For instance, the angle range reduction operation includes: determining the angel range corresponding to the to-be-processed angle as the reduced scanning angle range, in response to the angle range of the to-be-processed angle being less than the set value;

dividing the to-be-processed angle into two symmetrical angles according to an angular bisector of the to-be-processed angle, in response to the angle range of the to-be-processed angle being not less than the set value;

controlling the direction of the main lobe of the phased-array antenna to respectively point to the directions of angular bisectors of the two angles;
acquiring the power of signals received by the phased-array antenna in the directions of the angular bisectors of the two angles respectively; and
selecting a corresponding angle with larger power of the received signal from the two angles as a new to-be-processed angle and executing the angle range reduction operation again.

Optionally, the maximum scanning angle range is from −60° to +60°.

In summary, at least some embodiments of the present disclosure provide a signal receiving apparatus. The apparatus may acquire the maximum scanning angle range of the phased-array antenna, and reduce the maximum scanning angle range by the binary search method based on the power of the signals received by the phased-array antenna, until the difference between the maximum and the minimum of the reduced scanning angle range is less than the set value. As the maximum scanning angle range is reduced multiple times by the binary search method, the time taken to receive the signal of the display device is shortened, and the efficiency of receiving the signal is improved.

At least some embodiments of the present disclosure provide a signal receiving apparatus, which comprises:
a processing unit; and
a memory configured to store executable instructions of the processing unit, wherein
in a case where the executable instructions are executed, the processing unit is configured to: acquire the maximum scanning angle range of a phased-array antenna;
reduce the maximum scanning angle range by a binary search method based on the power of signals received by the phased-array antenna, until the difference between the maximum and the minimum of the reduced scanning angel range is less than the set value; and
use the reduced scanning angle range to receive a signal.

In some embodiments, the processing unit is further configured to: determine an angle corresponding to the maximum scanning angle range as a to-be-processed angle; and
execute the angle range reduction operation.

For instance, the angle range reduction operation may include:
determining the angle range corresponding to the to-be-processed angle as the reduced scanning angle range, in response to the angle of the to-be-processed angle being less than the set value;
dividing the to-be-processed angle into two symmetrical angles according to an angular bisector of the to-be-processed angle, in response to the angle of the to-be-processed angle being not less than the set value;
controlling the direction of the main lobe of the phased-array antenna to respectively point to the directions of angular bisectors of the two angles;
acquiring the power of signals received by the phased-array antenna in the directions of the angular bisectors of the two angles respectively; and
selecting a corresponding angle with larger power of the received signal from the two angles as a new to-be-processed angle and executing the angle range reduction operation again.

In some embodiments, the maximum scanning angel range is from −60° to +60°.

In some embodiments, the set value is 0.1°.

In some embodiments, the phased-array antenna is a phased-array liquid crystal antenna.

In some embodiments, the set value is the minimum angle scanning interval of the phased-array antenna.

In some embodiments, the processing unit is also configured to: align the main lobe of the phased-array antenna to the direction of one of the maximum and the minimum of the reduced scanning angle range to receive the signal.

In summary, the embodiments of the present disclosure provides a signal receiving apparatus. The apparatus may acquire the maximum scanning angle range of the phased-array antenna, and reduce the maximum scanning angle range by the binary search method based on the power of the signals received by the phased-array antenna, until the difference between the maximum and the minimum of the reduced scanning angle range is less than the set value. As the maximum scanning angle range is reduced multiple times by the binary search method, the time taken to receive the signal of the display device is shortened, and the efficiency of receiving the signal is improved.

Figure 8:
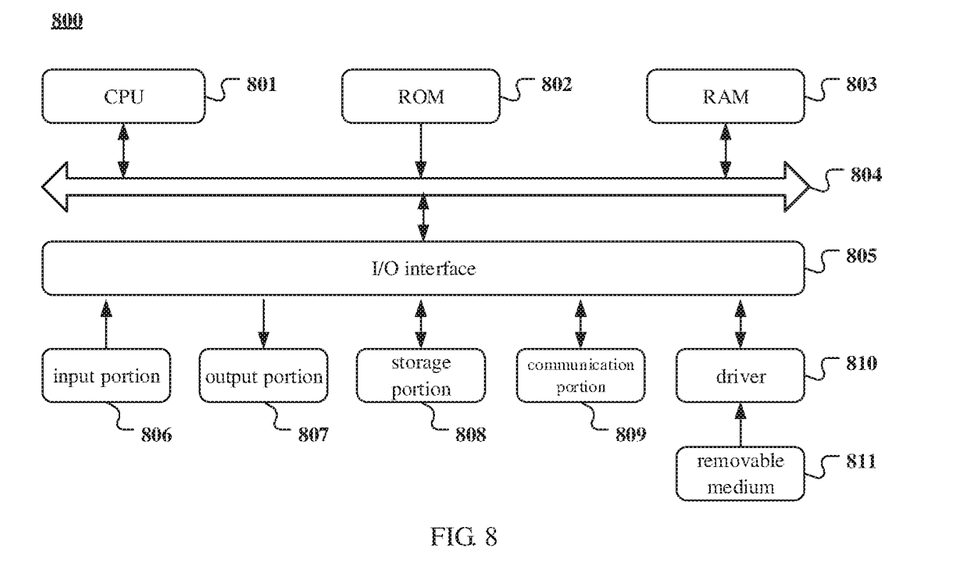
FIG. 8 is a schematic structural view of a computer system adapted to implement the signal receiving apparatus or the signal receiving method provided by at least some embodiments of the present disclosure.

FIG. 8 is a schematic structural view of a computer system 800 adapted to implement the signal receiving apparatus or the signal receiving method provided by at least some embodiments of the present disclosure.

As shown in FIG. 8, the computer system 800 includes a central processing unit (CPU) 801, which can execute various appropriate actions and processes in accordance with programs stored in an ROM 802 or programs loaded from a storage portion 808 into an RAM 803. Various programs and data required for the operation of the system 800 are also stored in the RAM 803. The CPU 801, the ROM 802 and the RAM 803 are connected with each other through a bus 804. An input/output (I/O) interface 805 is also connected to the bus 804.

The following components are connected to the I/O interface 805: an input portion 806 such as a keyboard or a mouse; an output portion 807 such as a cathode ray tube (CRT), a liquid crystal display (LCD) and a loudspeaker; a storage portion 808 such as a hard disk; and a communication portion 809 such as an LAN card and a network interface card of a modem, etc. The communication portion 809 executes communication processing through a network such as the Internet. A driver 810 is also connected to the I/O interface 805 as required. A removable medium 811 such as a magnetic disk, an optical disk, a magneto optical disk or a semiconductor memory is mounted on the driver 810 as required, so that computer programs read from the driver can be mounted into the storage portion 808 as required.

Particularly, according to the embodiments of the present disclosure, the process described above with reference to FIG. 1 or FIG. 2 may be implemented as a computer software program. For instance, the embodiments of the present disclosure include a computer program product which contains computer programs tangibly embodied on a machine readable medium. The computer program includes program codes for executing the method in FIG. 1 or FIG. 2. In such embodiments, the computer program can be downloaded and installed from the Internet through the communication portion 809, and/or installed from the removable medium 811.

The flowcharts and the block diagrams in the drawings illustrate possible architectures, functions and operations of systems, methods and computer program products in accordance with the embodiments of the present disclosure. In this regard, each block of the flowchart or the block diagram can represent a module, a program segment, or a portion of code, and the module, the program segment or the portion of code includes one or more executable instructions for implementing the specific logic functions. It should be also noted that in some alternative implementations, the functions noted in the blocks may also occur in an order different from that illustrated in the drawings. For example, two successively represented blocks may in fact be executed substantially in parallel, and may sometimes be executed in the reverse order, depending upon the involved function. It is also noted that each block of the block diagram and/or the flowchart and combinations of blocks in the block diagrams and/or the flowcharts can be implemented in a dedicated hardware-based system for implementing the specified function or operation, or can be implemented with a combination of dedicated hardware and computer instructions.

The units or modules involved in the description of the embodiments of the present application may be implemented by software or by hardware. The described unit or module may also be disposed in the processor, for example, may be described as: a processor including an acquisition module and a reduction unit. The names of these units or modules do not in any way constitute a limitation on the unit or module itself.

At least some embodiments of the present disclosure provide a computer readable storage medium. The storage medium is a non-transitory readable storage medium. Instructions are stored in the computer readable storage medium. When the computer readable storage medium runs on a processing unit, the processing unit can execute the signal receiving method as shown in FIG. 1 or FIG. 2.

At least some embodiments of the present disclosure provide a computer program product. Instructions are stored in the computer program product. When the computer program runs on a computer, the computer can execute the signal receiving method as shown in FIG. 1 or FIG. 2.

At least some embodiments of the present disclosure provide a chip, which comprises programmable logic circuits and/or program instructions. The chip is used for implementing the signal receiving method as shown in FIG. 1 or FIG. 2 when the chip is in operation.

Figure 9:
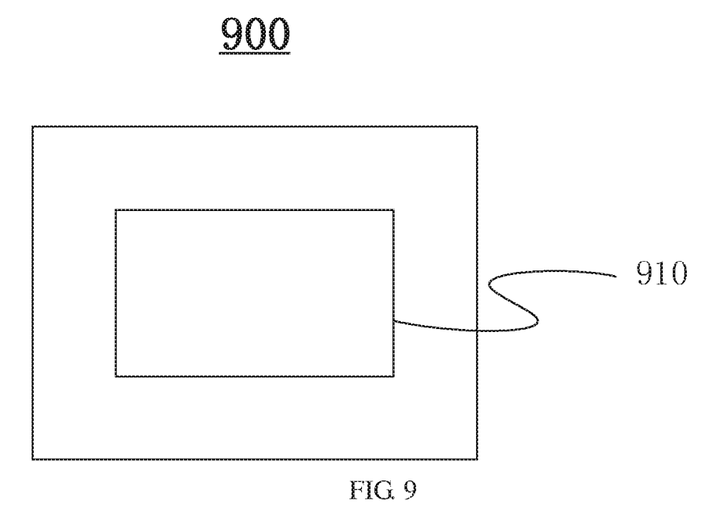
FIG. 9 is a schematic block diagram of an electronic device provided by at least some embodiments of the present disclosure.

At least some embodiments of the present disclosure further provide an electronic device, which comprises the signal receiving apparatus provided by any forgoing embodiment. The electronic device may be, for example, a personal computer, a smart mobile phone, a smart TV, a tablet PC, a personal digital assistant (PDA), an e-book reader, etc. No limitation will be given here in the embodiment of the present disclosure. As shown in FIG. 9, an electronic device 900 provided by at least some embodiments of the present disclosure comprises a signal receiving apparatus 910 provided by any foregoing embodiment.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

The foregoing merely are exemplary embodiments of the disclosure, and not intended to define the scope of the disclosure, and the scope of the disclosure is determined by the appended claims.

What is claimed is:

1. A signal receiving method, comprising:
   acquiring a maximum scanning angle range of a phased-array antenna; and
   reducing the maximum scanning angle range by a binary search method, based on power of signals received by the phased-array antenna, until a difference between a maximum and a minimum of a reduced scanning angle range is less than a set value; and
   using the reduced scanning angle range to receive a signal,
   wherein the reducing the maximum scanning angle range by the binary search method, based on the power of the signals received by the phased-array antenna, until the difference between the maximum and the minimum of the reduced scanning angle range is less than the set value, comprises:
   determining an angle corresponding to the maximum scanning angle range as a to-be-processed angle; and
   executing an angle range reduction operation.

2. The method according to claim 1, wherein the angle range reduction operation comprises:
   determining an angle range corresponding to the to-be-processed angle as the reduced scanning angle range, in response to an angle value of the to-be-processed angle being less than the set value;
   dividing the to-be-processed angle into two symmetrical angles according to an angular bisector of the to-be-processed angle, in response to the angle value of the to-be-processed angle being not less than the set value;
   controlling a direction of a main lobe of the phased-array antenna to point to directions of angular bisectors of the two symmetrical angles in turn;
   acquiring the power of the signals received by the phased-array antenna in the directions of the angular bisectors of the two symmetrical angles respectively; and
   selecting, from the two symmetrical angles, a corresponding angle with larger power of the received signal as the to-be-processed angle and executing the angle range reduction operation again.

3. The method according to claim 1, wherein the maximum scanning angle range is from −60° to +60°.

4. The method according to claim 1, wherein the set value is 0.1°.

5. The method according to claim 1, wherein the phased-array antenna is a phased-array liquid crystal antenna.

6. The method according to claim 1, wherein the set value is a minimum angle scanning interval of the phased-array antenna.

7. The method according to claim 1, further comprising:
   aligning a main lobe of the phased-array antenna to a direction of one of the maximum and the minimum of the reduced scanning angle range to receive the signal.

8. A non-transitory computer readable storage medium, storing instructions, wherein in a case where the computer readable storage medium runs on a processing unit, the processing unit executes the signal receiving method according to claim 1.

9. A signal receiving apparatus, comprising:
   an acquisition module, configured to acquire a maximum scanning angle range of a phased-array antenna; and
   a reduction module, configured to reduce the maximum scanning angle range by a binary search method, based on power of signals received by the phased-array antenna, until a difference between a maximum and a minimum of a reduced scanning angle range is less than a set value, wherein the reduced scanning angle range is used for receiving a signal,
   wherein the reduction module is further configured to:
   determine an angle corresponding to the maximum scanning angle range as a to-be-processed angle; and
   execute an angle range reduction operation.

10. An electronic device, comprising the signal receiving apparatus according to claim 9.

11. The apparatus according to claim 9, wherein the angle range reduction operation comprises:
- determining an angle range corresponding to the to-be-processed angle as the reduced scanning angle range, in response to an angle value of the to-be-processed angle being less than the set value;
- dividing the to-be-processed angle into two symmetrical angles according to an angular bisector of the to-be-processed angle, in response to the angle value of the to-be-processed angle being not less than the set value;
- controlling a direction of a main lobe of the phased-array antenna to respectively point to directions of angular bisectors of the two symmetrical angles;
- acquiring the power of the signals received by the phased-array antenna in the directions of the angular bisectors of the two symmetrical angles respectively; and
- selecting, from the two symmetrical angles, a corresponding angle with larger power of the received signal as the to-be-processed angle and executing the angle range reduction operation again.

12. The apparatus according to claim 9, wherein the maximum scanning angle range is from −60° to +60°.

13. A signal receiving apparatus, comprising:
- a processing unit; and
- a memory, configured to store instructions that are capable of being executed by the processing unit, wherein
- the executable instructions, when executed by the processing unit, cause the processing unit to perform operations comprising:
  - acquiring a maximum scanning angle range of a phased-array antenna; and
  - reducing the maximum scanning angle range by a binary search method, based on power of signals received by the phased-array antenna, until a difference between a maximum and a minimum of a reduced scanning angle range is less than the set value, and
  - using the reduced scanning angle range to receive a signal;

wherein the operations further comprise:
- determining an angle corresponding to the maximum scanning angle range as a to-be-processed angle; and
- executing an angle range reduction operation.

14. The apparatus according to claim 13, wherein the angle range reduction operation comprises:
- determining an angle range corresponding to the to-be-processed angle as the reduced scanning angle range, in response to an angle value of the to-be-processed angle being less than the set value;
- dividing the to-be-processed angle into two symmetrical angles according to an angular bisector of the to-be-processed angle, in response to the angle value of the to-be-processed angle being not less than the set value;
- controlling a direction of a main lobe of the phased-array antenna to respectively point to directions of angular bisectors of the two symmetrical angles;
- acquiring the power of the signals received by the phased-array antenna in the directions of the angular bisectors of the two symmetrical angles; and
- selecting, from the two symmetrical angles, a corresponding angle with larger power of the received signal as the to-be-processed angle and executing the angle range reduction operation again.

15. The apparatus according to claim 13, wherein the maximum scanning angle range is from −60° to +60°.

16. The apparatus according to claim 13, wherein the set value is 0.1°.

17. The apparatus according to claim 13, wherein the phased-array antenna is a phased-array liquid crystal antenna,
- the set value is a minimum angle scanning interval of the phased-array antenna, and
- the operations further comprise:
  - aligning a main lobe of the phased-array antenna to a direction of one of the maximum and the minimum of the reduced scanning angle range to receive the signal.

* * * * *